3,476,292
APPARATUS FOR MAKING
POLYURETHANE FOAM
Guy G. Joseph, Highland Park, and Robert K. Teverbaugh and Angelina A. Maniquis, Chicago, Ill., assignors, by mesne assignments, to Holiday Inns of America, Inc., Memphis, Tenn., a corporation of Tennessee
Filed Aug. 4, 1966, Ser. No. 570,189
Int. Cl. B67d 5/52, 5/60, 5/64
U.S. Cl. 222—135                                3 Claims

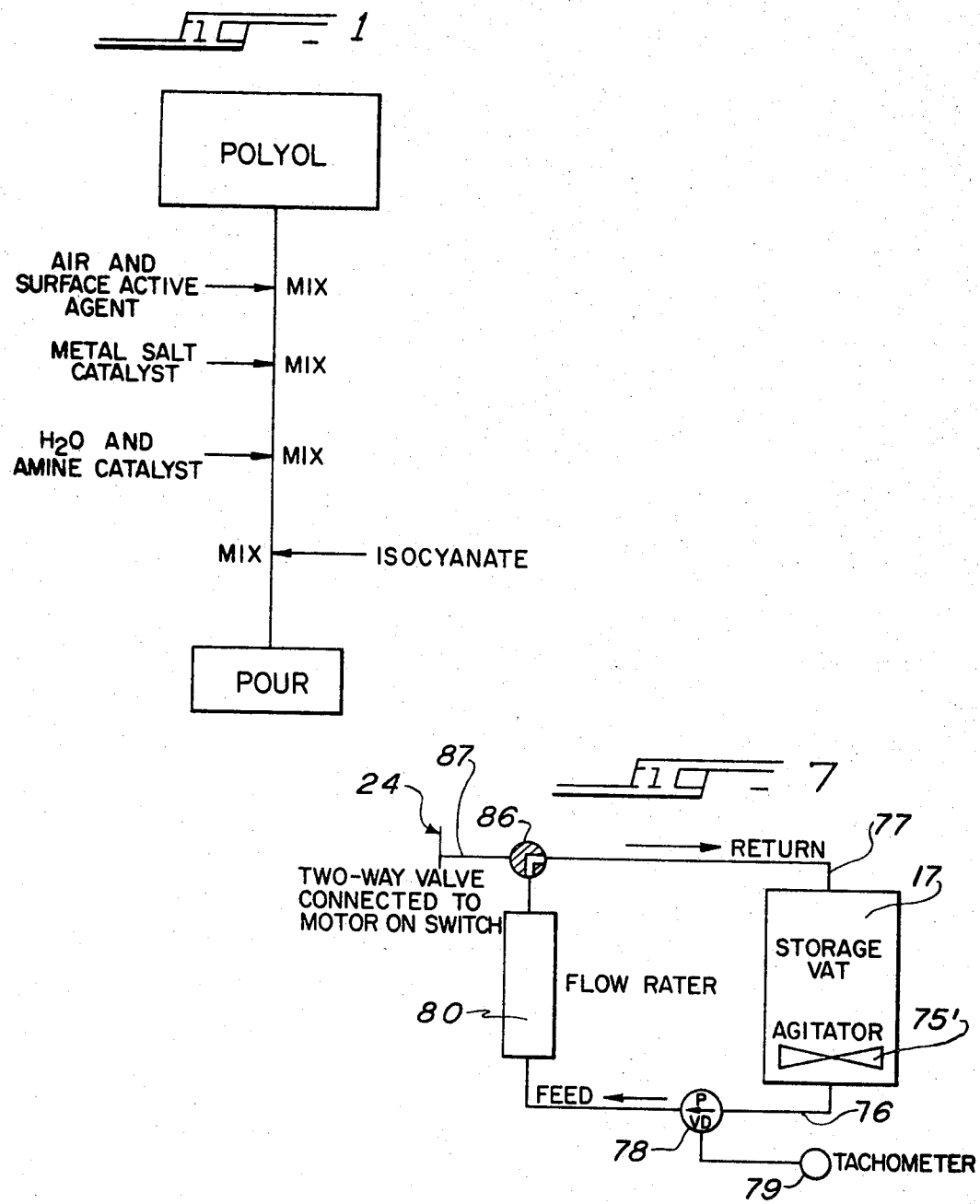

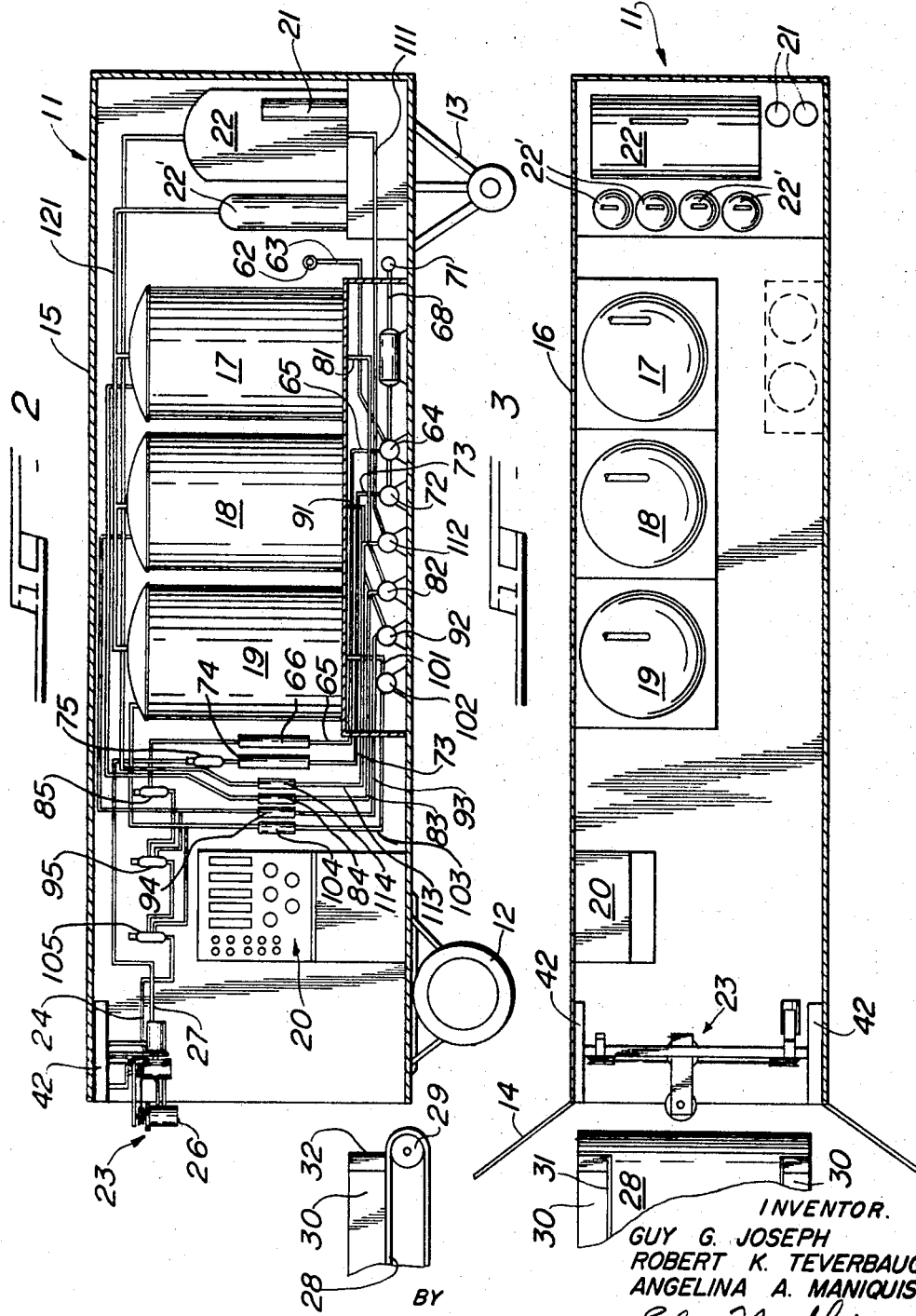

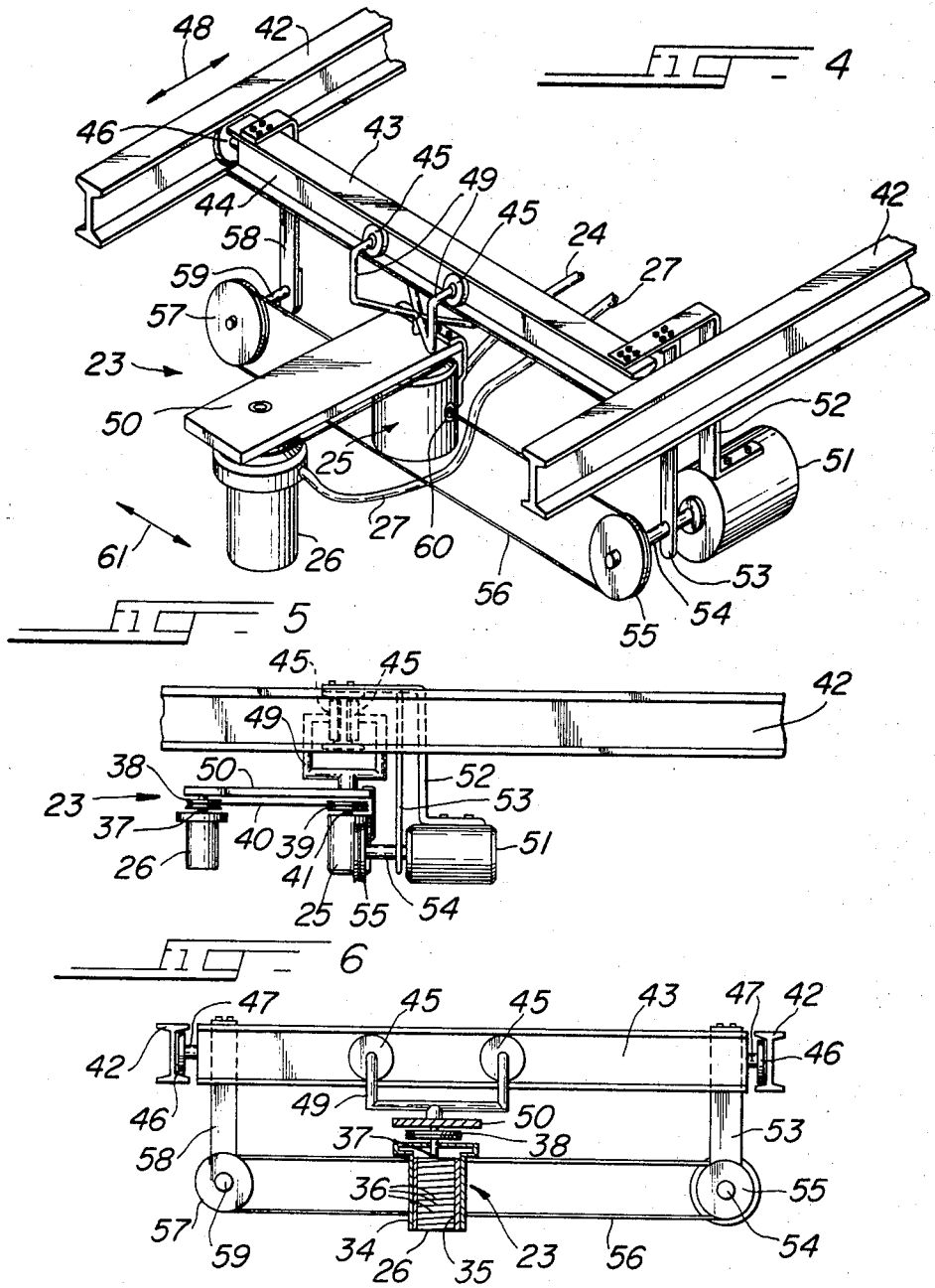

ABSTRACT OF THE DISCLOSURE

A readily transportable, mobile polyurethane foam making unit is provided. The unit has means to store, pump, and meter the ingredients to a precursor composition pouring means which is movable transversely on said unit.

---

The present invention is directed to a novel method and related apparatus for making polyurethane foams and more especially relates to what we term "sequential monitoring" whereby excellent cellular foams are readily and conveniently made. Our invention also encompasses easily transportable, mobile, foam making units specifically designed for use with such sequential monitoring process which we believe will drastically alter the basic economics of the polyurethane foam industry. By the practice of our process, polyurethane foam fabrication may now be carried out in the space of a moderately sized truck or van and the large plants presently being used can readily be superseded although it will of course be understood that our process may also be used as part of a permanent, stationary, foam making facility. The beneficial implications of such new foam making process and related apparatus will be immediately apparent to those skilled in this particular art.

To the best of our knowledge, there are two major problems now facing polyurethane foam producers. One of these basically is of a technical-production nature and the other is economic. Our invention is directed to the resolution of both of these problems.

As regards the former problem and as is well known to those skilled in this art, despite the fact that polyurethane foams have been fabricated for some time and have become substantial items of commerce, even now extreme care must still be taken in the measuring and mixing of the reactants and catalysts which go into the manufacturing process. In order to provide a desired end product of the aimed-for physical properties, e.g., pore size and uniformity thereof, density, strength, etc., practically no deviation in either materials or timing can be tolerated. This has necessitated both elaborate and sophisticated metering equipment along with the use of highly skilled personnel to supervise and practice the process. Despite this, the prior art processes have proven wasteful in terms of their yielding poor quality polyurethane foams which far too often must be relegated to the scrap heap. While a broad spectrum of polyurethane foams exists, such foams have heretofore been manufactured in a batch process, or by a process wherein separate streams of individual components are simultaneously metered to a final mixing chamber or by a process comprising a combination of the above two described processes to meet either general or very specific trade specifications. Products falling without such specifications either have had a substantially reduced marketability or no marketability at all.

The problems of measuring the reactants and catalysts in the polyurethane foam-making process are greatly magnified by the fact that the reaction is so rapid and the process is so sensitive to variations in composition (with the added feature that the raw materials used are relatively expensive), that even minute errors in the initial allotment of raw material practically cannot be tolerated. Furthermore, in accordance with the teachings of the prior art and with the standard commercial practices today, blending is accomplished by one of the aforementioned methods. If the workmen in a particular plant err in either their calculations or metering in the batch process when all or part of the reactants have been poured into the reaction or mixing vessel, there is practically no use for the defective batch and such then becomes a complete economic waste. This then is one of the problems that we resolve and alleviate in our process.

The other major problem stems from what may be alluded to as "the shipment of air." Polyurethane foam, whether rigid or flexible, and even those which are fairly dense are relatively bulky, light-weight materials, comprising a cellular structure of polyurethane entrapping a considerable greater volume of air. Shipping costs, even in box car lots, are substantial and as a practical matter this has necessitated the erection of foaming plants in discrete marketing areas, for with long range shipment the cost would be prohibitive. The very nature of the product is such and its pricing so competitive that the long range shipment of finished material is completely unfeasible. This problem too we believe is considerably alleviated by the practice of our process and the use of our apparatus therefor.

As briefly alluded to above, presenty used polyurethane foam making processes employ what may be termed either a batch process or what others may sometime refer to as a semicontinuous process. In either process, some of the reactants and catalysts are first mixed together. One requirement is that the materials used in such mixing not react to form the desired foam or a foam precursor of the desired end product. There may be several pre-mixed batches with the attempt being made to have as much pre-mixing as possible before the reactant pre-mixes are fed into a final mixing chamber to give the polyurethane generating reaction. From the final mixing chamber the materials are fed onto a forming web or mold or the like to produce the foam in place. This has required the use, especially in large scale plants, of extensive mixing vats and the like with relatively large space requirements therefor.

In distinction to all this, we have developed a continuous polyurethane foam making process which can be carried out in a relatively small space—in fact, as noted above, in the space of a moderately sized van. Such process is not only continuous with the inherent benefits thereof, but furthermore makes use of sequential monitoring or mixing of the reactants in the process whereby the waste of raw material charge can either be minimized or if errors are made can be readily adjusted to still produce useful items of commerce thereby basically overcoming some of the serious technical-production problems of the prior art. At the same time the process and apparatus hereof is readily portable so that rather than producing polyurethane foams at one central location and then shipping these low density, high air containing materials, it is new completely feasible and possible to produce polyurethane foams directly at the plant of the fabricator. All of this is set out in greater detail below.

One disadvantage of the batch process is that all components are mixed at the same time and are maintained in this condition for a relatively extended period of time. Under such conditions the components undergo reactions or physical changes within the batch which alter their chemical potentials. This change, regardless of its rate, is a progressive function of time. Therefore, the consistency of aggregated components changes from moment to moment. These changes invariably adversely affect the end product, making guaranteed consistency almost an impossibility.

Accordingly, a primary object of our invention is a continuous method of making polyurethane foams by the use of a sequential monitoring process.

Another important object of our invention is to provide a mobile, polyurethane foam-making apparatus which includes a wheeled vehicle whereby the same is readily portable and movable from plant site to plant site as desired.

These and other objects, features and advantages of our invention will become apparent to those skilled in this particular art from the following detailed disclosure thereof and the accompanying drawings in which:

FIGURE 1 is a flow diagram of our polyurethane foam making process;

FIGURE 2 is a side view of our portable foam making unit;

FIGURE 3 is a top view of said unit;

FIGURE 4 is a perspective view showing the movable, traversable pour spout assembly for use herewith;

FIGURE 5 is a side view of said pour spout assembly;

FIGURE 6 is a front view of said pour spout assembly; and

FIGURE 7 is a schematic view of one embodiment of a pumping, circulating mechanism for use herewith.

In carrying out our process various raw material reactants and catalysts are employed some of which are similar to those used in current commercial practice. However, of course, the materials are treated quite differently in a novel process representing a substantial advance in the art of polyurethane foam formation.

One of the materials that is used and is one of the two primary reactants in the polyurethane foam making process is a liquid organic resin (hereinafter at times referred to as a polyol) selected from the group of materials consisting of polyethers, polyesters, polythioethers, polyesteramides, alkylene glycols and polyisocyanate modifications thereof, which materials are characterized by a molecular weight of greater than 500 and which have at least two reactive hydroxyl groups per molecule. Examples of the foregoing are poly (oxyethylene) glycols and poly (oxypropylene) glycols, or copolymers of these, materials which collectively may be referred to as poly (oxyalkylene) ethers.

The other principal reactants in the polyurethane foam making reaction are aromatic or aliphatic polyisocyanates. This may also include substituted aromatic polyisocyanates. Representative examples of these materials include 2,4-toluene diisocyanate; 2,6-toluene diisocyanate; ethylene diisocyanate; ethylidene diisocyanate; propylene-1,2-diisocyanate; butylene-1,2-diisocyanate; hexylene-1,6-diisocyanate; cyclohexylene-1,2-diisocyanate; M-phenylene diisocyanate; 3,3'-dimethyl-4,4'-biphenylene diisocyanate; 3,3'-dimethoxy-4,4'-biphenylene diisocyanate; 3,3'-diphenyl-4,4'-biphenylene diisocyanate; 4,4'-biphenylene diisocyanate; 3,3'-dichloro-4,4'-biphenylene diisocyanate; triphenylmethane triisocyanate; 1,5-naphthalene diisocyanate, or polyisocyanates in a blocked or inactive form such as the bisphenyl carbamates of toluene diisocyanate, etc.

Another component of the polyurethane foam forming reactant system is water. In the preferred embodiment of fabricating the foam in the practice of our process, deionized water is used and especially the cations are removed from tap water. However, this is optional, for tap water of course can be used albeit the resulting product is not quite as good. It is noted that metal ions in the water may act as a catalyst for the polyurethane foam reaction and thus would act as an unknown, uncontrolled catalyst, and for this reason is undesirable.

Another important part of the present reaction system or process is the catalysts which are used. In most cases, and especially in the preferred embodiment of our process two catalysts are employed. One of such catalysts, oftentimes referred to as a "carbon dioxide generating" catalyst, both assists in the generation of carbon dioxide gas and promotes the linear polymeric build-up between the isocyanate and the polyol materials which are the principal constituents in the process. The second catalyst, referred to as a "cure" catalyst enhances the cross-linked density of the finished polyurethane foam.

The $CO_2$ generating catalysts are preferably tertiary amines. We prefer to use triethylenediamine although for example other such amine catalysts such as tetramethylbutane diamine, N-methyl morpholine and N-ethyl morpholine may also be used in addition to other similar catalysts.

As the preferred cure catalyst, we employ stannous octoate although many other metallic estesr or salts of aliphatic carboxylic acids may also be similarly used. Exemplary of these types of materials in addition to the stannous octoate are stannous oleate and dibutyl tin dilaurate.

Another type of material that we prefer to use in the polyurethane foam process is an emulsifying agent or a surfactant i.e., a surface-active agent. These materials apparently act as "healants" to permit the escape of gases out of the pores of the structure until the cure thereof takes place thereby maintaining the integrity of the pore walls. Practically any emulsifier or surface-active agent compatible with the other reactants may be used. Exemplary of these materials are organic siloxanes.

An optional ingredient in the use of our process is the compound termed "an auxiliary blowing agent." In the usual polyurethane foam reaction, carbon dioxide gas which forms during the reaction is quite adequate to produce the open cell structure of the finished material. In this usual case an auxiliary blowing agent is not required but in other embodiments where a very soft, flexible product is desired the auxiliary blowing agent serves a useful function. Representatives of such blowing agents are the readily volatilized halogenated hydrocarbons.

The flow diagram comprising FIG. 1 hereof is illustrative of the preferred embodiment of our process. We first provide a master stream of the first major constituent, i.e., the polyol-polyether type material, and into this stream we then sequentially add and mix the various other reactants in the process. At the first input station we preferably meter in an well mix into the master stream both air and the surfactant or emulsifying agent. The surfactant treats the polyol with surface activity and allows or facilitates the uniform dispersion of subsequent components in the polyol stream. The air which is blended in is entrapped in the stream and uniformly dispersed with the aid of the surfactant. The entrained air serves as a nucleating point for bubble formation and cell growth, so that its uniform dispersion or distribution will contribute to a uniform cell structure in the end product. The surfactant lowers the surface tension of the system so that there is a greater degree of bubble formation. This produces finer cells and reduces the possibility of coalescence of small bubbles with larger sized ones.

At the second input station further along the continuous master stream line, we continuously add the "cure" catalyst for example, stannous octoate or other metal salts or esters of aliphatic carboxylic acids. Just as is the case at the first input station, here the added materials are metered in continuously and are well mixed in to the master stream.

It should be noted the cure catalyst is completely compatible with the original stream. This is the finest of all streams and is critical in quantity, such that its mixing upstream is essential to effect an even distribution, without relying on high shear or speed of mixing in the final mixing chamber, as is done in the prior art. Its dispersion in the polyol is essential in that it should uniformly catalyze at all reaction sites in the mixture. Studies of the kinetics and catalysis of urethane foam reactions indicate the formation of an intermediate between the hydroxy-containing compound and the cure catalyst, which reacts readily with the isocyanate compound. Formation of this intermediate is thus facilitated and initiated by the introduction of the catalyst at the second blending station.

At the third input station, the water-amine catalyst is blended in. Because of the hydrolyzable nature of some surfactants and cure catalysts, it is preferable to meter in the water-amine component at the last blending station before the isocyanate. The water and the amine may be metered in separately or together as a mix. Most amine catalysts, especially triethylenediamine, have satisfactory solubilities in water, form stable aqueous solutions and can give supersaturated solutions, which may be diluted to desired concentrations or ratios.

At this stage of the introduction of the various materials of the process there has been essentially no chemical reaction and especially no foaming reaction in the flow stream. If for example a valve or a meter has been erroneously set thereby introducing the wrong amount of additive or additives, it is possible to readjust the various constituents of the polyol-additive stream. This of course can also be accomplished at any of the earlier stages of material addition. At this point, however, we come to a critical stage in the process, namely, the addition of the poly-isocyanate component. Once such isocyanate has been mixed with the polyol stream, there is no turning back for as these are mixed the foaming reaction begins practically immediately and the operator must then pour the reactants of the resulting composition onto the foam forming means.

If an auxiliary blowing agent is employed, it is preferable to meter into the isocyanate stream rather than into the polyol stream, for ease of processing because of the viscosities involved. Said stream is then brought into intimate contact with the first master stream. The two are mixed as they pass along the flow line and are then poured through the exit port.

Accordingly, as may be seen from the foregoing, the entire process from introduction of the various materials to the pour point is continuous.

In carrying out our process, the percentages and weights of the various reactants may be based upon the weight of the polyol which is used. For 100 parts by weight of polyol, the following parts by weight of the other materials are used:

Surfactant or emulsifying agent—0.5 to 2
Cure catalyst—0.15 to 0.5
Water—1.5 to 5
Amine catalyst—0.1 to 1.0
Polyisocyanate—35 to 55
Auxiliary blowing agent—0 to 30

Flow rates up to 500 pounds of polyol per minute are readily available with our process. In carrying out the reaction, the temperature should be preferably maintained around 70° to 80° F. Further in carrying out the reaction, the utensils and conduits should be of such a material that will not react with the various reactants or catalysts of the process.

To the foregoing recitation of compositions also should be added air. The volume of air to use will be determined by the operator whereby an amount adequate to assure cell definition of the finished product is used. The dry air is preferably mixed into the polyol stream at the first input metering station as shown in the flow diagram. However, alternatively, the air may be introduced into the isocyanate stream rather than the polyol master stream.

It should be noted while the foregoing process description and the flow diagram of FIG. 1 hereof represents our preferred embodiment numerous variations can be made in the process. Of utmost importance is the feature of combining the polyol constituent with the isocyanate as the last step prior to the pouring of the mix onto the foaming web or the like. These two principal constituents vigorously and rapidly react to form the polyurethane foam. Once they have been combined not only is there no time to add the other reactants, etc. but furthermore, it is no longer possible to adjust relative amounts thereof if an error has been made. Therefore the isocyanate addition to the polyol should be the last step prior to pour. Except for this limitation it is feasible to vary the order of introducing the catalysts, etc. into the polyol stream from thaot which is set forth in the flow diagram. For example, one may add the metal salt catalyst prior to the air and surface-active agent, or the amine catalyst may be mixed in first. In fact the order of mixing the three additives into the polyol stream may be practically varied at will.

The process may be further understood by reference to the following example:

One hundred pounds of polyoxypropylene glycol is pumped through a conduit member. As the flow stream enters the area of the first input station, air and 1 pound of a silicone oil are continuously metered therein. Then, as the flow stream enters the second input station 0.25 pound of stannous octoate is continuously pumped into the flow stream. Subsequently, as such stream enters the area of the third input station, 0.5 pound of triethylenediamine catalyst in 2.5 pounds of water is continuously metered in. The flow stream is then led into the upper portion of the foam pour spout. At this point 40 pounds of toluene diisocyanate are continuously metered into said upper portion also and the two principal streams are further well mixed as they progress to the spout of the pour nozzle from whence the combined materials are deposited onto the foam forming belt. An excellent quality, flexible polyurethane foam results.

It should clearly be understood that in the practice of our process the material reactants and catalysts are continuously metered into the flow stream. The rate of introduction varies as a function of the flow rate of the polyol constituent primarily with the proper adjustments being made to insure proper mixing and proportioning of the input materials along the flow line. Thus, for example, if in the previous example the polyol was flowing at a rate of 10 pounds per minute; 0.1 pound of silicone oil, 0.025 pound of stannous octoate, etc. per minute would be continuously metered into such polyol stream. Surges or variations of such auxiliary inputs should be avoided.

Attention is now directed to the apparatus portion of our invention as illustrated in FIGURES 2 through 7. Like numerals are used throughout.

At the outset it should be recognized that the present mobile foaming unit has a somewhat limited storage capacity. It is designed for carrying an adequate amount of catalysts, auxiliary blowing agents and ion exchange beds for water treatment, but it is not designed, nor is it necessary to store therein the large volumes of polyol and isocyanate which are required in large scale polyurethane foam manufacture. Such two principal materials are used in tank-car or tank-truck quantities and are separately conveyed to the production site. Small quantities of these materials may be carried in the portable unit but these quantities would be quite limited. Our foam generator is driven or towed to the fabricator's plant where it is met by portable tank units containing the large volume reactants. Members are provided in the portable unit for connecting the tank cars or trucks into the flow stream as will be more fully described as the description proceeds.

As is illustrated in FIGS. 2 and 3, our portable unit is housed in a truck van or trailer 11, or the like. This has the usual rear wheels 12, a support 13, and rear doors 14. It is most desirable that the van be enclosed by a roof 15 and walls 16 (preferably heat insulated) in order that the interior thus formed be capable of having the temperature thereof closely controlled as by air conditioning, auxiliary heaters and the like in order to maintain the environment of the reactants and catalysts at the proper, optimum temperature.

A plurality of relatively large storage tanks, 17, 18, 19, are carried in the van, with for example, tank 17 being used for the surface-active agent, tank 18 for the metal salt catalyst and tank 19 for the amine catalyst-water component. The output of such tanks is controlled and metered by metering units which may be contained in the control console 20. The van also contains ion exchange tanks 21 for water demineralization and a tank 22 for holding the auxiliary blowing agent. There are also tanks 22' for nitrogen storage. All of said tanks and the control console are joined by the necessary liquid conduits and pumping means as is hereinafter more fully described. It should of course be understood that additional similar tanks may be carried in the extra space in the van shown in the drawing.

At the ear, i.e. openable-end portion of the truck and mounted dependently from the roof 15 thereof is a nozzle assembly, generally denoted by the reference numeral 23. When the rear doors 14 are closed such nozzle assembly is in a forward position in the van and when the mobile unit is to be operated, such nozzle assembly is moved into pour position over the rear or tailgate of the truck with the pour spout 26 extending beyond the rear end of the van for a purpose which will be disclosed as the description proceeds.

The materials used in the process are conveyed to the pour spout 26, by feed lines 24 and 27.

From the pour spout 26, the foam mixture is fed onto the foam forming web 28. This is basically a continuous moving belt, one guide roller of which is denoted by the numeral 29 and which transports the foam directly into the fabricator's plant. In order to keep the foam precursor material on the forming web 28 until it develops a self supporting structure a pair of side guides 30 is provided and onto such side guides is continuously fed paper 31 off of paper supply reel 32 which is then subsequently stripped from the side of the foam mass by paper take-up reel, not shown in the drawing.

The pour spout 26 is traversible from side to side in the van. This is necessary to provide an even flow of the foam precursor mix onto the forming web, i.e., as the material pours from the spout it is evenly distributed across the width of the belt. At the same time such pour spout 26 also functions as a final mixing member for the foam precursor materials.

In order to provide for the traversibility of the pour assembly 23 from side to side in the van, and at the same time permit its forward and rearward movement therein, one embodiment of said assembly is illustrated in FIGS. 4 through 6. As shown, a pair of structural steel members such as I-beams, 42 are mounted on the ceiling of the van (see FIGS. 2 and 3). Transverse to the inwardly facing channels on each such I-beams, and rollably mounted therein, is a support member 43. Said support member 43 has side channels 44 in which ride a pair of wheels 45, which in turn carry the pour spout 26 on support arm 50. At the ends of the support members 43 are wheels 46 freely rotatable about their respective shafts 47. By means of such construction the support member 43 (and thus the pour spout 26) is fully slidable in the directions of arrow 48.

The wheels 45 are mounted on shafts 49 and such shafts are in turn affixed to the pourspout support arm 50 (as best seen in FIGS. 5 and 6). By means of such wheels the pour spout is traversable from side to side along the entire length of support member 43.

In order to provide the traversing action a motor 51 is provided. This motor is mounted on support member 43 by a bracket 52. A second bracket member 53, affixed to bracket 52 supports a motor drive shaft 54 which in turn drives a pulley member 55. A belt 56 joins said pulley member to an idle pulley 57 mounted on support 43 by means of bracket 58 and pulley shaft 59.

The pulley belt 56 is attached to the opposite sides of the casing of the motor 25 by fittings 60 and by this means reciprocal, traversing action of the motor 51 is imparted to the pour spout 26 whereby the same is traversable in the directions of arrow 61.

The pour sprout has an outer casing 34 which is stationary and an inner member 35 which is rotatable. On the inner circumference of the rotatable member 35 are a plurality of vanes or baffles 36, which play an important part in the final mixing of the foam precursor materials. The internal spout member 35 is rotated by shaft 37 which in turn is rigidly affixed to the center of a first pulley member 38. Said first pulley member is joined to a drive pulley 39 by means of belt 40 or the like and said drive pulley 39 is in turn driven by a motor 25 by means of a shaft 41.

As noted above, the two principal constituents, namely the polyol and the polyisocyanate are conveyed to the site of foam production in separate tank cars or the like. The polyol is pumped into our mobile foaming unit by a fitting denoted by the reference numeral 62 in FIG. 2. The pumping and metering apparatus for the polyol is preferably in our mobile unit.

The polyisocyanate is introduced into the pour nozzle after having been metered by a metering unit preferably contained in the mobile van and controlled by equipment in the control console. The polyisocyanate is conducted from the tank car into the feed line in the van and from this point on delivery and metering of the polyisocyanate is preferably controlled within the mobile van.

More specifically, the polyisocyanate is introduced into the van through fitting 1 and line 68 and is first pumped by a pump 72. From said pump the polyisocyanate is led through conduit member 73 through a flowmeter 74, an in-line blender 75 and from thence by means of conduit 27 into the pour nozzle 26. It is noted that when an auxiliary blowing agent is used such is introduced into the polyisocyanate through the in-line blender 75.

The polyol stream after entry through fitting 62 passes through conduit 63 to a pump 64. From thence it is impelled through conduit 65 through a flowmeter 66 and then through a series of in-line blenders and a conduit 24 to the pouring nozzle 26. At each of said in-line blenders the various constituents from the storage tanks 17, 18, 19 are blended into the polyol stream.

In our process, as stated above, the contents of the tanks, 17, 18 and 19 are continuously and sequentially monitored into the polyol stream.

The surface active agent (in tank 17) is fed through conduit 81 into a pump 82 from whence it is impelled through conduit 83 through a flowmeter 84 and from thence into the inline blender 85. At such blender 85 the surface active agent is introduced into the polyol stream. Also, through such blender air is likewise introduced.

The metal salt catalyst (in tank 18) is fed through conduit 91 into a pump 92 from whence it is impelled through conduit 93 through a flowmeter 94 and from thence into the in-line blender 95. At such blender 95 the catalyst is introduced into the polyol stream.

The water-amine catalyst (in tank 19) constituent is fed through conduit 101 into a pump 102 from whence it is impelled through a conduit 103 through a flowmeter 104 from then into an in-line blender 105. At such blender 105 this constituent is introduced into the polyol stream.

As noted above, the auxiliary blowing agent is stored in tank 22. When the operator wishes to use this optional agent it is first fed by means of conduit 111 into a pump 112 from whence it is impelled through a conduit 113 through a flowmeter 114 and from thence into the in-line blender 75.

Nitrogen in the storage tank 22' is fed to the storage tanks 17, 18 and 19 by means of the conduit 121.

The tank cars which are used to convey the polyol and the polyisocyanate to the fabrication site may either be in the form of a single tank or, in the alternative, are compartmented into two or more separate tanks. With such two tank structures it is quite feasible to have both principal constituents in one vehicle which, of course, is economically beneficial especially for relatively smaller production runs.

The mixing and metering of the reactants and catalysts in the polyurethane reaction must be critically controlled. To the best of our knowledge most commercially available valve control systems permit variations in flow whereby it is most difficult, if not impossible, to pre-set the valve controls for a substantially completely assured flow-rate. Preferably in the practice of our process and in the use of our apparatus, as illustrated in FIG. 7 a by-pass arrangement may be employed whereby the system is set in operation and after the flow-rate has been determined and properly adjusted, the valves are then converted from by-pass to their respective inputs into the flow stream. A similar system is used with all the reactants and accordingly, while only one input apparatus is shown in FIG. 7, it should be understood that the description is applicable for all the storage tanks and related pumping and metering equipment used in our process. It will of course be understood that known pump and meters which permit critical control may be used in lieu of such bypass arrangement.

In FIG. 7 there is diagrammatically illustrated a reactant or catalyst storage tank, 17, having an agitator 75' therein for stirring the contents thereof. There is an outlet line 76 running from the bottom of the tank and an inlet line 77 at the top. A variable displacement pump 78, controlled by tachometer 79, is inserted in the outlet line 76. From the pump the liquid contents in the line are passed through a flow measuring device 80 where the flow is accurately measured. From the flow measuring device, while the system is on "by-pass," the two-way valve 86 directs the liquid back into the storage tank 17 through the inlet pipe 77. Such by-passing continues until the flow is accurately set for use in the present sequential monitoring process. All of the inputs are so adjusted.

Then, as for example, when the polyol is started in its flow stream the valve 86 is reset to it input position to force the liquid into line 87 and from thence into the polyol stream in line 24.

It will be understood that various modifications and variations may be effected without departing from the spirit or scope of the novel concepts of our invention.

We claim:

1. Apparatus for making polyurethane foams which comprise in combination: a portable, wheeled vehicle; means for storing, continuously pumping and sequentially metering compositions for use in polyurethane foam production, said means at least partially carried in said wheeled vehicle; polyurethane foam precursor composition pouring means mounted on said vehicle, and means for conveying said compositions to said pouring means, said polyurethane foam precursor composition pouring means being traversable transversely on said vehicle and adaptable for storage in said vehicle when not in use, and said polyurethane foam precursor composition pouring means comprising: a nozzle member; mixing means internal in said nozzle member; drive means for said mixing means; and drive means for energizing such traversable movement.

2. The apparatus as defined in claim 1, wherein said mixing means comprises a rotatable member having a plurality of vanes; and said third to last-mentioned means includes a track assembly depending from the roof of said vehicle and a transverse support member rotatably mounted on said track assembly.

3. The apparatus as defined in claim 1 in which said wheeled vehicle comprises a truck trailer or van and fittings are provided in said vehicle for introducing some of said compositions into the vehicle from sources outside thereof.

References Cited

UNITED STATES PATENTS

| | | | |
|---|---|---|---|
| 3,207,378 | 9/1965 | Trumbull et al. | 222—134 |
| 3,229,855 | 1/1966 | Eggert | 222—134 X |
| 3,239,100 | 3/1966 | Peterson | 222—135 X |

ROBERT B. REEVES, Primary Examiner

H. S. LANE, Assistant Examiner

U.S. Cl. X.R.

222—145, 176